United States Patent

[11] 3,620,991

| [72] | Inventor | Richard Barkman Wasser<br>Rowayton, Conn. |
|---|---|---|
| [21] | Appl. No. | 762,620 |
| [22] | Filed | Sept. 25, 1968 |
| [45] | Patented | Nov. 16, 1971 |
| [73] | Assignee | American Cyanamid Company<br>Stamford, Conn. |

[54] PREPARATION OF AQUEOUS SOLUTION OF ACRYLAMIDE CONTAINING NO FREE OXYGEN AND POLYMERIZATION OF ACRYLAMIDE THEREIN
8 Claims, No Drawings

[52] U.S. Cl. .................................................. 260/29.6 Z,
260/29.6 MQ
[51] Int. Cl. ................................................................ C08f 1/00
[50] Field of Search ........................................... 260/29.6 Z,
29.6 EM, 29.6 H

[56] References Cited
UNITED STATES PATENTS

| 3,278,506 | 10/1966 | Chamot ...................... | 260/29.6 |
|---|---|---|---|
| 3,365,409 | 1/1968 | Lanthier ...................... | 260/29.6 |

*Primary Examiner*—Donald J. Arnold
*Assistant Examiner*—Leon Garrett
*Attorney*—Evans Kahn

ABSTRACT: Dissolved molecular oxygen in aqueous solutions of acrylamide is inactivated without significant detriment to the acrylamide and to the solution as a polymerization medium, by adding a water-soluble metal sulfite and allowing the solution to stand at pH 4-8. If desired, excess sulfite can be decomposed without harm to the acrylamide by raising the pH of the solution above 8, and the acrylamide therein can be polymerized or copolymerized by conventional means.

PREPARATION OF AQUEOUS SOLUTION OF ACRYLAMIDE CONTAINING NO FREE OXYGEN AND POLYMERIZATION OF ACRYLAMIDE THEREIN

The present invention relates to a process for selectively inactivating dissolved molecular oxygen by chemical means in aqueous solutions of acrylamide alone or with other water-soluble vinyl monomers copolymerizable therewith. The invention also relates to the production of polyacrylamide and other water-soluble polymers from aqueous vinyl monomer solutions which contain dissolved molecular oxygen.

It is known in the prior art that acrylamide in aqueous solution can be homopolymerized and that a mixture of acrylamide and water-soluble vinyl monomers copolymerizable therewith can be copolymerized in aqueous solution by dissolving in the solution one or more vinyl polymerization catalysts of the free radical-forming type, after which the monomer content of the solution undergoes an apparently spontaneous polymerization. The catalysts possess the property of converting a part of the vinyl monomer content of the solution into free radical form. The free radicals are active loci which cause the remainder of the vinyl monomers present to polymerize thereon by a chain reaction. The process is in wide commercial use.

A problem in the process is that industrial makeup water generally has a high content of dissolved molecular oxygen, and dissolved molecular oxygen ($O_2$) in the process described is detrimental to the polymerization. As little as one part per million of dissolved molecular oxygen, based on the weight of the solution, causes a significant retardation of the rate at which the polymerization proceeds. As a result, it is present practice to remove as much as possible of this oxygen prior to addition of the catalyst. Present-day practice is to employ physical means (vacuum, or sparging with an inert gas), but these means are slow and often leave part of the oxygen unremoved.

The problem has consequently arisen of chemically inactivating (or otherwise removing) dissolved molecular oxygen from aqueous solutions of acrylamide (and from aqueous solutions of acrylamide and other vinyl monomers copolymerizable therewith) in a speedy, simple and economical manner without significant harm to the vinyl monomer content of the solution and without detriment to the solution as a polymerization medium.

The discovery has now been made that the aforesaid problem is solved by a method which comprises adding a water-soluble ionizing sulfite to an aqueous solution of acrylamide alone (or to an aqueous solution of acrylamide and one or more water-soluble vinyl monomers copolymerizable therewith) which has a dissolved content of molecular oxygen and allowing the solution to stand while at a pH between 5 and 8. The sulfite is added in stoichiometrical excess over the dissolved molecular oxygen in the solution and access of air to the solution is prevented while it is standing. The sulfite is without significant effect upon the vinyl monomer content of the solution, and all of the oxygen in the solution disappears, leaving a solution which contains the unreacted (excess) portion of the sulfite, but no material which inhibits polymerization of the vinyl material.

It has furthermore been discovered that this residual sulfite may be destroyed by adjusting the pH of the solution to a valve about 8 and following the solution to stand briefly.

The practical success of the process of the present invention is surprising, since it is known that the water-soluble sulfites react with water-soluble vinyl compounds, including acrylamide, and that the reaction products are not capable or undergoing vinyl polymerization. The present invention results in part from the discovery that in the pH range 5-8 this proceeds comparatively slowly and that the reaction of dissolved sulfites with oxygen proceeds comparatively rapidly, and that as a consequence it is possible to prepare an aqueous solution of acrylamide which contains no detectable amount of oxygen without converting more than a negligible percentage of the acrylamide (and other vinyl monomers present) to nonpolymerizable form.

By way of illustration it has been found that when 0.1 g. of sodium sulfite is added to 100 ml. of a 10 percent by weight aqueous solution of acrylamide at 10° C. and pH 7 which contains no dissolved oxygen, half of the sulfite disappears by reaction with the acrylamide in about 18 minutes, whereas when the same amount of sodium sulfite is added to the same solution which is saturated with air, half of the dissolved molecular oxygen disappears in about 10 seconds.

Any of the known water-soluble ionizing sulfites can be used in the process of the present invention and this class includes the water-soluble ionizing bisulfites pyrosulfites and metabisulfites (and mixtures thereof). The cationic portion of these salts are not critical, and suitable cations include ammonium, lithium, magnesium, potassium, sodium and tetramethyl ammonium. Thus in the process there can be used ammonium sulfite, lithium bisulfite, magnesium pyrosulfite, sodium metabisulfite, and tetramethyl ammonium sulfite.

In the process, the water-soluble ionizing sulfite is added in stoichiometric excess over the amount of dissolved molecular oxygen in the mixture, in other words, in sufficiently large amount that the solution has a content of dissolved sulfite ions when the dissolved molecular oxygen had disappeared. This is critical, because substantially complete disappearance of the dissolved molecular oxygen is not achieved unless the sulfite is used in excess. The amount to be added in any instance can be determined by analyzing the solution for its dissolved content of molecular oxygen and then adding the sulfite in such amount as to provide more than one sulfite equivalent for each atom of oxygen present in the dissolved molecule. As a practical matter, I have found that 0.05 percent (based on the total weight of the solution) of a sulfite such as sodium sulfite provides the necessary excess in most instances, and I prefer to add a materially larger amount, for example, 0.5-1 percent to avoid the danger of adding too little. The sulfite may be added as a powder, or as a solution, as may be found the more convenient.

The dissolved molecular oxygen disappears rapidly after addition of the ionizing sulfite salt, more rapidly when the solution is warm than cold, and more rapidly when the solution pH is acid than alkaline. In a typical instance, when one-half percent of sodium bisulfite (based on the weight of the solution) is added to a 10 percent by weight solution of acrylamide at 10° C. percent and at pH 6 the oxygen disappears within 15 minutes.

After addition of the sulfite, access of air or molecular oxygen is prevented in any convenient way until the oxygen-free solution has been used for its intended purpose. The point at which substantially all of the dissolved molecular oxygen disappears may be determined by continuously analyzing the solution for dissolved molecular oxygen, or more simply by dropping from time to time a small amount (e.g. 5 ml.) of the solution into a large volume (e.g. 100 ml.) of anhydrous methanol. Polymerization commences at almost the moment at which the solution becomes free of dissolved molecular oxygen, and the polymer is substantially insoluble in methanol containing less than 5 percent of water. Direct analyses of dissolved molecular oxygen are provided by the polarographic oxygen analyzer.

It is an important feature of the invention that the residual (excess) sulfite can be decomposed without significant adverse effect upon the vinyl material or upon the solution as a polymerization medium by raising the pH of the solution to a valve above 8 and preferably to a value in the range of 9 to 10, and allowing the solution to stand at that pH. The sulfite anions disappear within 10 to 60 minutes at 0° C. to 60° C., after which if desired the pH may be adjusted to whatever value as may be appropriate for subsequent utilization of the solution.

The vinyl monomer content of the solutions produced as aforesaid can be polymerized in any desired or customary manner.

The step of decomposing the residual sulfite is critical when it is desired to form a polymer of ultrahigh molecular weight. With residual sulfite present, it is not possible to form a polymer having a molecular weight in excess of about a million, but with the residual sulfite decomposed, polymers having molecular weights in excess of 10 million can be rapidly produced.

Suitable initiators for the polymerization include hydrogen peroxide, t-butyl hydroperoxide, ammonium persulfate and redox combinations (for example, a mixture of ammonium persulfate and 3, 3′3′′ nitrilo-trispropionamide combination). Suitable amounts vary in each instance depending on the specific monomers present. The temperature of the solution, concentration of vinyl monomers in the solution, and the molecular weight which it is desired the polymer to have, and are most conveniently found by laboratory trial.

The reaction of dissolved sulfite with dissolved molecular oxygen is catalyzed by trace amounts of polyvalent metal ions, especially copper and iron. It is consequently possible to polymerize acrylamide and similar vinyl monomers practically instantly by adding a polymerization initiator and a trace of a soluble-ionizing polyvalent salt followed by a water-soluble ionizing sulfite. Polymerization of the vinyl monomer content of the solution usually occurs within a fraction of a minute.

The process of the present invention is applicable to aqueous solutions of acrylamide, and to aqueous solutions of acrylamide and vinyl monomers which are copolymerizable therewith. Typical monomers of the latter type include acrylic acid, methacrylic acid, 2-vinylpyridine, ethyl acrylate, 2-(diethylaminoethyl)acrylate, p-chlorophenyl trimethyl ammonium chloride, maleamic acid, and allylsulfonic acid. These monomers when present with acrylamide, provide mixed polymerizates containing acrylamide residues. In practice, to gain the benefit of the presence of acrylamide in the polymers the polymers are composed of at least 50 mol percent of acrylamide linkages, $-CH_2CH(CONH_2)-$.

The polymers of the present invention find use as dry strength agents for paper and, when of high molecular weight, as flocculants for suspended matter in sewage, sugar solutions, mining effluent, etc.

The process of the present invention is illustrated by the examples which follow. These examples are best embodiments of the invention and are not to be construed as limitations thereon.

EXAMPLE 1

The following illustrates the inactivation of dissolved molecular oxygen in an aqueous solution of acrylamide having a pH in the range of 5–8, according to the present invention.

Into a two-liter, round-bottomed flask fitted with thermometer and stirrer is poured one liter of a 10 percent by weight solution of acrylamide in water which has a temperature of 15° C. and which is saturated with air. The air above the solution in the flask is flushed out by a stream of nitrogen gas flowing from the end of a tube positioned over the surface of the solution. Flow of nitrogen is continued at such rate as to exclude air from access to the solution. There is then added 50 ml. of a 1 percent by weight solution of sodium bisulfite in water (equivalent to 500 p.p.m. of sodium bisulfite based on the weight of the solution), and the pH of the solution is adjusted to 6.0. At the end of 15 minutes the oxygen content of the solution is zero as determined by a polarographic oxygen analyzer (Beckman Model 777).

EXAMPLE 2

The procedure of example 1 is repeated, except that the solution treated is a solution of 7.5 percent by weight of acrylamide and 2.5 percent of acrylic acid in air-saturated water at 15° C. Results are substantially the same.

EXAMPLE 3

The procedure of example 1 is repeated, except that the solution treated is a 10 percent by weight solution of p-trimethylvinylphenyl ammonium chloride in air-saturated water at 10° C. Results are substantially the same.

EXAMPLE 4

The procedure of example 1 is repeated, except that the solution treated is a solution of 8 percent by weight of acrylamide and 2 percent of dimethylaminoethylmethacrylate in air-saturated water at 15° C. Results are substantially the same.

EXAMPLE 5

The procedure of example 1 is repeated, except that the solution treated is a solution of 9 percent by weight of acrylamide and 1 percent diallyl dimethyl ammonium chloride in air-saturated water at 15° C. Results are substantially the same

EXAMPLE 6

The following illustrates a process according to the present invention, wherein a solution is obtained which is substantially free both of dissolved molecular oxygen and sulfite.

The procedure of example 1 is repeated.

The pH of the resulting solution is raised to 12 and the solution is allowed to stand 1 hour at that pH at 20° C. The resulting solution contains substantially no dissolved molecular oxygen and no sulfite.

EXAMPLE 7

The procedure of example 6 is repeated, except that the sodium sulfite solution is replaced by an equivalent amount of a 1 percent solution of potassium sulfite in water. Results are substantially the same.

EXAMPLE 8

The following illustrates the process of the present invention with formation of a solution of polyacrylamide.

To 1,325 ml. of air-saturated water at 10° C. in a nitrogen-blanketed two-liter reaction flask is added with stirring 3 ml. of an 18 percent by weight solution of a 1:4 mixture of sodium sulfite:sodium bisulfite. The pH of the solution is adjusted to 6. After 15 minutes, 450 g. of an air-saturated aqueous solution containing 40 percent by weight of acrylamide at pH 6 and 10° C. is added to the flask, followed by an additional 2 ml. of the sodium sulfite-bisulfite solution. After 30 minutes the solution is oxygen-free, and contains a small amount of residual sulfite-bisulfite.

The pH is then raised to 12.5 by addition of 6.8 ml. of a 50 percent by weight solution of NaOH in water. Thirty minutes later the solution is substantially free of sulfite and bisulfite ions.

There is then added 0.072 g. of ammonium persulfate (0.04 percent on the weight of the acrylamide) as polymerization initiator, and the nitrogen blanket is continued.

After 24 hours the acrylamide has polymerized to a polymer having a molecular weight in excess of 10,000,000. The polymer contains 8 mol percent of $-CH_2CH(COOX)$ linkages, wherein X is Na or H, resulting from hydrolysis of amide substituents during the process.

The foregoing process is repeated except that no sulfite is added. No polymerization occurs, and the viscosity of the solution remains substantially constant.

EXAMPLE 9

The following illustrates a process of the present invention wherein the polymerization is effected by a redox catalyst with formation of a polymer containing very few carboxy substituents.

The process of example 8 is repeated to the point where the 50 percent sodium hydroxide solution is added. Then, a 50 percent by weight solution of sodium hydroxide in water is added, but only so much as to raise the pH of the solution to 10. After 30 minutes decomposition of the residual sulfite is complete.

The pH of the solution is then decreased to 5 by addition of aqueous HCl, followed by addition of 0.072 g. of ammonium persulfate and 0.29 g. of 3, 3′ 3′′ -nitrilotrispropionamide.

Polymerization begins at once. The product is a high molecular weight acrylamide polymer composed of —CH$_2$CH(CONH$_2$)— and —CH$_2$CH(COOH)— linkages in about 99:1 molar ratio.

EXAMPLE 10

The process of example 9 is repeated except that the acrylic acid is replaced by an equimolecular amount of freshly prepared, oxygen-free diallyl dimethyl ammonium chloride. A product of similar molecular weight is obtained which, however, possesses a strong cationic charge.

EXAMPLE 11

The process of example 8 is repeated except that the sodium sulfite:sodium bisulfite mixture is replaced by 5 ml. of an 18 percent solution of ammonium pyrosulfite in water. Results are substantially the same.

EXAMPLE 12

The procedure of example 8 is repeated except that the sodium sulfite:sodium bisulfite solution is replaced by an aqueous solution containing 0.9 g. of magnesium sulfite. Results are substantially the same.

EXAMPLE 13

The following illustrates the rapid deactivation of dissolved molecular oxygen and the catalyzed polymerization of a mixture of acrylamide and a cationic pyridine, according to the process of the present invention, by a water-soluble polyvalent metal ion.

To 900 cc. of air-saturated water under a blanket of nitrogen gas is added 90 g. of acrylamide, 10 g. of 2-vinyl pyridine and 10 cc. of a 0.01 percent solution of cuprous chloride. The mixture is stirred until uniform, warmed to 25° C. and adjusted to pH 7. There is then added with stirring, in one increment, 0.5 cc. of a 20 percent by weight solution of potassium metabisulfite. Thirty seconds later the temperature starts to increase and there is a noticeable increase in viscosity. The polymerization reaction ends within an hour; the product is a water-soluble cationic vinyl polymer substantially composed of —CH$_2$CH(CONH$_2$)— and —CH$_2$CH(C$_5$H$_5$N)— linkages and is recovered by precipitation from methanol.

I claim:

1. A process for inactivating dissolved molecular oxygen in an aqueous solution of acrylamide which consists essentially in adding a water-soluble ionizing sulfite to said solution in stoichiometric excess over the oxygen dissolved therein, excluding gaseous oxygen from access to said solution, allowing said solution to stand at a pH in the range of 5 to 8 for 10 to 60 minutes at 0° C. to 60° C. until substantially all of said dissolved oxygen has been converted to chemically reacted form and then raising the pH of said solution above 8 and allowing said solution to stand until said solution has substantially no content of sulfite.

2. A process according to claim 1 wherein the ionizing sulfite is sodium bisulfite.

3. A process according to claim 1 wherein the weight of added sulfite is about 0.05 percent of the weight of the solution.

4. A process according to claim 1, wherein the pH of the solution is between 5.5 and 6.5 during conversion of said oxygen to chemically reacted form.

5. A process according to claim 1 wherein the solution is at a temperature between 0° C. and 30° C. during and subsequent to addition of said sulfite.

6. A process according to claim 1 wherein the aqueous solution contains between 5 and 10 mol percent of diallyl dimethyl ammonium chloride per mol of acrylamide therein.

7. A process according to claim 1 wherein the pH of the solution is further raised to 12 after it has been raised to 8.

8. A process for preparing an aqueous solution of a polyacrylamide from an aqueous solution comprising acrylamide and dissolved molecular oxygen, which consists essentially in adding a water-soluble ionizing sulfite to said solution in stoichiometric excess over the oxygen dissolved therein, excluding gaseous oxygen from access to said solution, allowing said solution to stand at a pH in the range of 5 to 8 for 10 to 60 minutes at 0° C. to 60° C. in accordance with claim 1, until substantially all of said oxygen has been converted to chemically reacted form, then elevating the pH of the solution above 8 and allowing the solution to stand at said elevated pH until the solution has substantially no content of sulfite, and then adding a vinyl polymerization catalyst and allowing said solution to stand until polymerization of at least a substantial part of said acrylamide has occured.

* * * * *

Case 22,279

UNITED STATES PATENT OFFICE
CERTIFICATE OF CORRECTION

Patent No. 3,620,991    Dated November 16, 1971

Inventor(s) RICHARD BARKMAN WASSER

It is certified that error appears in the above-identified patent and that said Letters Patent are hereby corrected as shown below:

Column 1 line 61 "valve" should read -- value --; column 1 line 62 "about" should read -- above --; column 1 line 62 "following" should read -- allowing --; column 1 line 66 "or" should read -- of --; column 1 line 68 after "this" insert -- reaction --. Column 2 line 44 after "10°C." delete "percent"; column 2 line 64 "valve" should read -- value --. Column 4 line 12 after "same" insert period -- . --.

Signed and sealed this 23rd day of May 1972.

(SEAL)
Attest:

EDWARD M. FLETCHER, JR.        ROBERT GOTTSCHALK
Attesting Officer              Commissioner of Patents